(12) United States Patent
Nonnenmacher et al.

(10) Patent No.: US 11,821,803 B2
(45) Date of Patent: Nov. 21, 2023

(54) PRESSURE SENSOR WITH IMPROVED SELF-HEALING DIAPHRAGM

(71) Applicant: Robert Bosch GmbH, Stuttgart (DE)

(72) Inventors: Dorothee Nonnenmacher, Leinfelden-Echterdingen (DE); Gustav Klett, Moessingen (DE); Joachim Kreutzer, Reutlingen (DE); Joachim Friedl, Reutlingen (DE); Lars Sodan, Balingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 63 days.

(21) Appl. No.: 17/393,759

(22) Filed: Aug. 4, 2021

(65) Prior Publication Data

US 2022/0042871 A1 Feb. 10, 2022

(30) Foreign Application Priority Data

Aug. 6, 2020 (DE) .......................... 102020209980.4

(51) Int. Cl.
*G01L 9/00* (2006.01)
*G01L 19/06* (2006.01)

(52) U.S. Cl.
CPC ........ *G01L 19/0627* (2013.01); *G01L 9/0041* (2013.01)

(58) Field of Classification Search
None
See application file for complete search history.

(56) References Cited

U.S. PATENT DOCUMENTS

| 5,218,972 | A | * | 6/1993 | Gorsuch | ............... | A61B 5/033 |
| | | | | | | 600/588 |
| 2002/0162397 | A1 | * | 11/2002 | Orr | ......................... | G01L 13/00 |
| | | | | | | 73/700 |
| 2011/0274794 | A1 | * | 11/2011 | Gerbaulet | .......... | B65D 85/8061 |
| | | | | | | 99/302 R |

FOREIGN PATENT DOCUMENTS

| EP | 3432962 A1 | 1/2019 |
| GB | 2385922 A | 9/2003 |

OTHER PUBLICATIONS

Ghosh S. „Self-healing Materials: Fundamentals, Design Strategies, and Applications, Wiley-VCH Verlag GmbH & Co. KGaA, Weinheim, ISBN: 978-3-527-31829-2. Retrieved from the Internet on Aug. 3, 2021: https://www.researchgate.net/profile/Abdelkader-Bouaziz/post/How-can-I-synthesize-self-healable-polymer-coatings-without-using-nano-micro-capsules/attachment/59d6339ac49f478072ea245e/AS%3A273645430083597%401442253563501/download/Self-Healing+Materials+-+Fundamentals%2C+Design+Strategies%2C+and+Applications.pdf. 307 Pages.

(Continued)

*Primary Examiner* — Brandi N Hopkins
*Assistant Examiner* — Nigel H Plumb
(74) *Attorney, Agent, or Firm* — NORTON ROSE FULBRIGHT US LLP; Gerard Messina

(57) ABSTRACT

A sensor includes a sensing element for detecting a property and/or a composition of a surrounding medium of the sensor, a transmission medium for transmitting a property and/or a composition of the surroundings medium onto the sensing element, the transmission medium being situated in such a way that the transmission medium is applied to the sensing element, and a cover, which distances the transmission medium from the surrounding medium, the cover being manufactured from a self-healing material, in particular, the (Continued)

cover being designed as a flexible membrane which is made up of a self-healing material.

10 Claims, 3 Drawing Sheets

(56) References Cited

OTHER PUBLICATIONS

Bartlett M. et al. „Self-healing materials for soft-matter machines and electronics, NPG Asia Materials (2019) 11:21, https://doi.org/10.1038/s41427-019-0122-1. Retrieved from the Internet on Aug. 3, 2021: https://www.researchgate.net/publication/333001015_Self-healing_materials_for_soft-matter_machines_and_electronics. 4 Pages.

* cited by examiner

PRESSURE SENSOR WITH IMPROVED SELF-HEALING DIAPHRAGM

FIELD

The present invention relates to a sensor, in particular, a pressure sensor, including a sensing element for detecting a property and/or a composition of a surrounding medium of the sensor.

The present invention furthermore relates to a method for manufacturing a sensor, in particular a pressure sensor, including the steps:
providing a housing including an opening;
introducing the sensing element into the housing; and
closing the opening of the housing with the aid of a cover.

BACKGROUND INFORMATION

Although the present invention may, in general, be applied to arbitrary sensors, the present invention is described with respect to sensors in the form of media-robust, encapsulated pressure sensors.

Media-robust, tightly encapsulated pressure sensors or packages, for example according to the oil tank principle, are used when pressures have to be measured in corrosive surroundings, such as for example in hydraulic systems. In the process, the media-robust, completely sealed package protects the sensing and evaluation electronics present in its interior from the corrosive surroundings, and nonetheless allows the external pressure to be determined. In the case of this package type, the transmission of the pressure signal from the package outer side to the inside sensing element takes place via a flexible membrane, which is designed as part of the package outer surface, and via an incompressible fluid, which completely fills the interior of the package.

The two goals of "transmitting the external pressure to the sensing element" and "protecting the electronic components from the surroundings" conflict with one another in the process. Two design approaches for resolving this conflict are conventional in this regard.

In the first approach, the package interior space is completely flooded with incompressible fluid prior to joining the flexible membrane. In this state, the flexible membrane is then joined onto the housing. To ensure that the entire package interior space is flooded with incompressible fluid, the housing/membrane joint site has to be situated below the fluid level of the incompressible fluid. To ensure that the entire package interior space is filled with the incompressible fluid, i.e., no air bubbles remain in the package, the filling usually takes place in a sealed chamber under a vacuum.

In the second approach, filling openings for the incompressible fluid and the joint for the flexible membrane are spatially separated: the assembly is initially completely created in the dry state. In the process, the flexible membrane may be joined onto the housing, for example by welding. Only thereafter is the filling of the package interior space with incompressible fluid through one or multiple filling opening(s) under a vacuum carried out. The subsequent closing of the filling openings also takes place under a vacuum and may take place, for example, by pressing in suitable plugs.

However, the fact that the filling under a vacuum is complex and cost-intensive is problematic, as is the increased space requirement and the limited flexibility with respect to the electrical signal conduction through the filling openings spatially separated from the housing/membrane joint.

SUMMARY

In one specific example embodiment, the present invention provides a sensor, in particular, a pressure sensor, including:
a sensing element for detecting a property and/or a composition of a surrounding medium of the sensor;
a transmission medium for transmitting a property and/or a composition of the surrounding medium onto the sensing element, the transmission medium being situated in such a way that the transmission medium is applied to the sensing element; and a cover, which distances the transmission medium from the surrounding medium, the cover being manufactured from a self-healing material, in particular, the cover being designed as a flexible membrane.

In one further specific example embodiment, the present invention provides a method for manufacturing a sensor, in particular, a pressure sensor, including the steps:
providing a housing including an opening;
introducing the sensing element into the housing;
closing the opening of the housing with the aid of a cover, in particular, designed as a flexible membrane, the cover being manufactured from a self-healing material, and an interior space being formed in the housing;
creating at least one temporary opening in the cover;
introducing the transmission medium into the interior space through the at least one temporary opening in the cover; and
closing the temporary opening.

One possible advantage in the process may be that a filling of the sensor with the incompressible fluid is made possible in a simple and cost-effective manner. One possible further advantage may be the high flexibility since no filling openings impair or limit the electrical signal conduction for the sensor. One possible further advantage may be that the space requirement during the manufacture may be reduced.

The expression "self-healing material" shall be understood to mean all materials which, themselves (actively) or through initiation (passively), at least partially compensate for at least physical damage. Examples of self-healing materials are listed in literature by Ghosh S. "Self-healing Materials: Fundamentals, Design Strategies, and Applications," WILEY-VCH Verlag GmbH & Co. KGaA, Weinheim, ISBN: 978-3-527-31829-2, and in literature by Bartlett M. et al. "Self-healing materials for soft-matter machines and electronics," NPG Asia Materials (2019) 11:21, https://doi.org/10.1038/s41427-019-0122-1, which are hereby incorporated by reference.

Further features, advantages and further specific embodiments of the present invention are described hereafter or become apparent thereby.

According to one refinement of the present invention, the transmission medium is an incompressible fluid, in particular, an oil. In this way, a transmission medium may be provided in a simple and cost-effective manner to transmit, in particular, properties of the surrounding medium onto the sensing element.

According to one further refinement, a protective layer, in particular, in the form of a metal layer, is situated on the cover. The advantage of a protective layer is that the cover, in particular, in the form of a flexible membrane, is protected from environmental influences, such as the surrounding medium, or also electromagnetic radiation, such as light, or the like. Overall, the service life of the sensor is thus increased.

According to one further refinement of the present invention, the sensor includes a housing in which the sensing element and the transmission medium are situated, the cover closing the housing toward at least one side, and an, in particular, circumferential, seal being situated on an outer side of the housing. The advantage of this is an easier integration of the sensor into an end product.

According to one further refinement of the method of the present invention, the closing of the at least one temporary opening occurs automatically and/or only after an appropriate initiation using initiation means. The advantage of an automatic closing is the simplicity of the process. Nothing further has to be done to close the opening. The advantage in the case of a closing of the opening which is to be initiated is that this may be carried out at an appropriate time and in a controlled manner.

According to one further refinement of the method of the present invention, the creation of the at least one temporary opening in the cover takes place by piercing the cover with the aid of a pointy and/or narrow object, in particular, in the form of a cannula. The advantage of this is a particularly simple and rapid creation of a temporary opening. "Narrow" and "pointy," in particular, mean that the "self-healing property" of the material of the membrane is not impaired by the design of the object, since the "self-healing property" is usually lost in the case of excessive damage. In this regard, "narrow" and "pointy" shall be understood with respect to the self-healing material: a material having low self-healing properties, for example, requires a narrower and/or pointier cannula than a material having great self-healing properties.

According to one further refinement of the method of the present invention, the introduction of the transmission medium takes place through the pointy and/or narrow object in the form of a cannula. The advantage of this is that the transmission medium may be particularly easily introduced into the interior space. A complex insertion of the pointy and/or narrow object and introduction of the transmission medium via a further feed unit is dispensed with.

According to one further refinement of the method of the present invention, at least two temporary openings are formed in the cover, and the introduction of the transmission medium takes place via one of the at least two temporary openings, and the interior space is vented, in particular, actively, via the second of the at least two temporary openings. The advantage of this is that, in this way, a rapid and simultaneously bubble-free filling of the interior space with incompressible fluid is made possible. Active venting may take place in that underpressure is applied via the second opening to the interior space, for example with the aid of a second cannula. Filling then takes place until incompressible fluid exits the opening or collects in the second cannula outside the interior space.

According to one further refinement of the method of the present invention, the initiation takes place with the aid of optical and/or thermal application of the cover. In this way, a closing of the openings may be initiated in a simple and simultaneously reliable manner.

According to one further refinement of the method of the present invention, a protective layer, in particular, a thin metal layer, is applied onto the cover, preferably with the aid of physical vapor phase deposition. The advantage of a protective layer is that the cover, in particular, in the form of a flexible membrane, is protected from environmental influences, such as the surrounding medium, or also light, or the like. Overall, the service life of the sensor is thus increased.

According to one further refinement of the method of the present invention, a seal is provided on the outer side of the housing, in particular, in a first step, the housing being manufactured with the aid of a two-component injection molding process and, in a second step, the cover and the seal being jointly manufactured. The advantages of this are, on the one hand, an easier integration of the sensor into an end product and, on the other hand, a simpler and faster manufacture of the sensor including the seal.

Further important features and advantages of the present invention are derived from the figures, and from the associated description of the figures.

It shall be understood that the above-mentioned features and those still to be described hereafter may be used not only in the particular described combination, but also in other combinations, or alone, without departing from the scope of the present invention.

Preferred embodiments and specific embodiments of the present invention are shown in the drawings and are described in greater detail in the following description, identical reference numerals referring to identical or similar or functionally equivalent components or elements.

DETAILED DESCRIPTION OF EXAMPLE EMBODIMENTS

Figure 1:
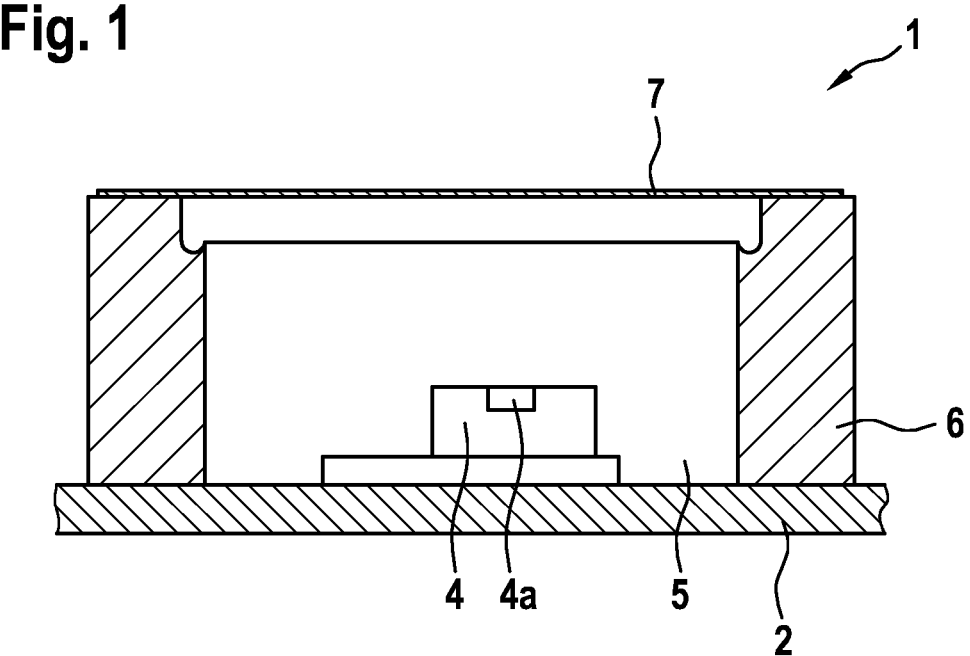
FIG. 1 shows a sensor according to one specific embodiment of the present invention in the cross-section prior to filling.
Figure 2:
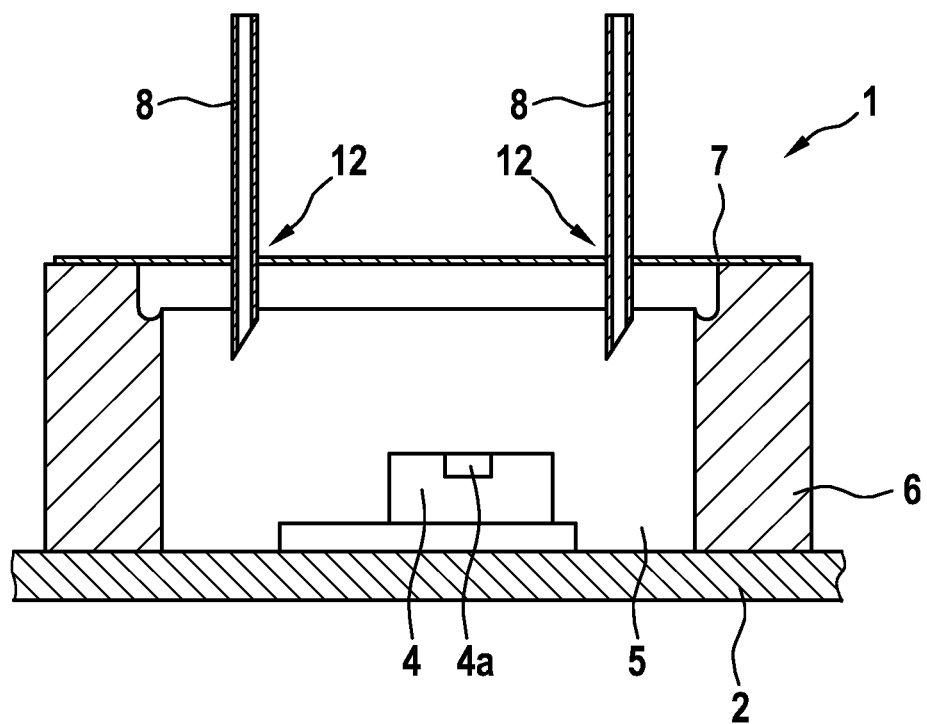
FIG. 2 shows the sensor according to FIG. 1 including cannulas pushed through the membrane.
Figure 3:
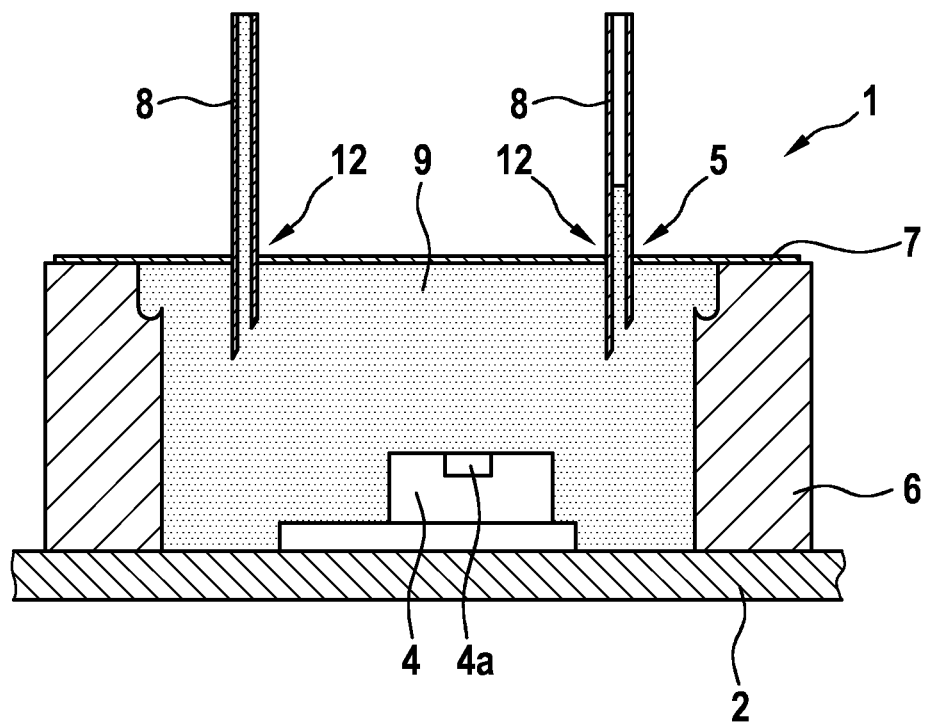
FIG. 3 shows the sensor according to FIG. 2 including cannulas pushed through the membrane after complete filling.
Figure 4:
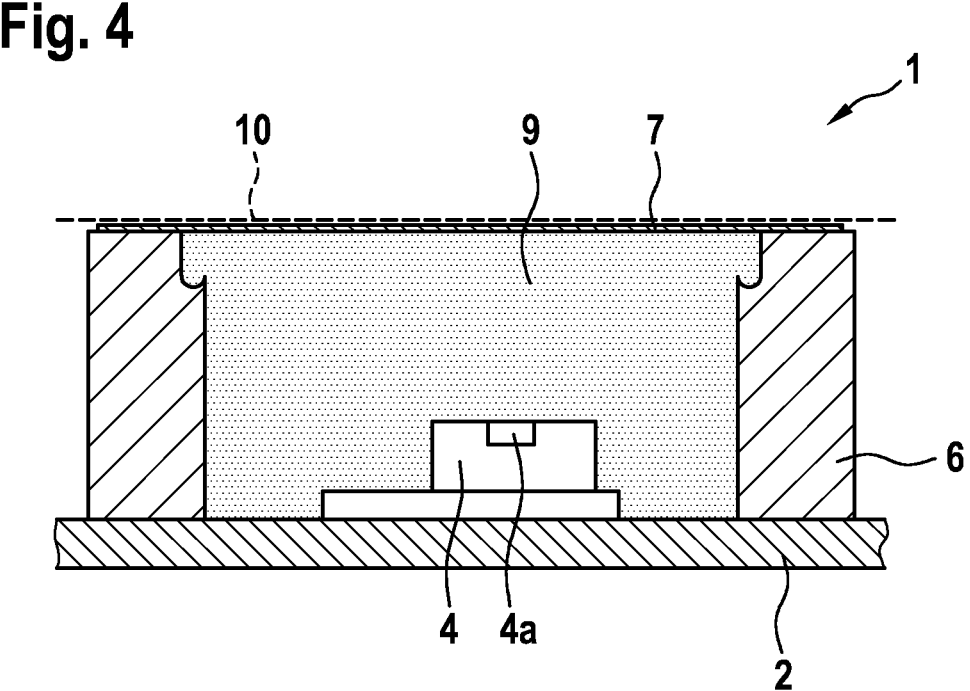
FIG. 4 shows the sensor according to FIG. 3 in the final state.

FIG. 1 shows a sensor according to one specific embodiment of the present invention in the cross-section prior to filling;

FIG. 2 shows the sensor according to FIG. 1 including cannulas pushed through the membrane; FIG. 3 shows the sensor according to FIG. 2 including cannulas pushed through the membrane after complete filling; and FIG. 4 shows the sensor according to FIG. 3 in the final state.

In detail, FIGS. 1 through 4 each show a sensor 1, which includes a substrate 2 and a rewiring plane (not shown) situated in substrate 2. A chipset 4 including at least one sensing element 4a is situated in a housing, in the form of a sleeve 6, situated on substrate 2. Chipset 4 includes, for example, an evaluation electronics for sensing element 4a. Sensing element 4a may be designed as a MEMS sensing element 4a.

Sleeve 6 is thus closed on the one side by substrate 2, and on the other side sleeve 6 is closed with the aid of a flexible membrane 7 made up of self-healing material. In this way, an interior space 5 is formed. Self-healing membrane 7 may be joined in the process with the aid of welding, or housing 6 and membrane 7 may be jointly manufactured by two-component injection molding.

For filling interior space 5, two narrow cannulas 8 are now pushed at a sufficient distance from one another through flexible membrane 7. In this way, two temporary openings 12 are formed. This step may optionally be carried out under a vacuum.

An incompressible fluid 9 is now filled into interior space 5 via the one of the two cannulas 8, the left cannula in FIG. 3. In the process, the interior space may be actively vented via second cannula 8 and/or be subjected to underpressure. Interior space 5 is completely filled when the level in the right cannula 8 is above the plane of flexible membrane 7. Thereafter, the two cannulas 8 are removed.

After cannulas 8 have been removed, the self-healing of flexible membrane 7 occurs either without further intervention or supported by a suitable stimulus, for example with the aid of optical and/or thermal irradiation or, in general, by a thermal reorganization of the membrane components. Temporary openings 12 are closed thereby.

In one further optional process step, the application of a thin metal layer 10 takes place, for example, with the aid of physical vapor phase deposition, to suppress diffusion processes through flexible membrane 7, and to protect flexible membrane 7 from environmental influences, such as for example UV light.

Figure 5:
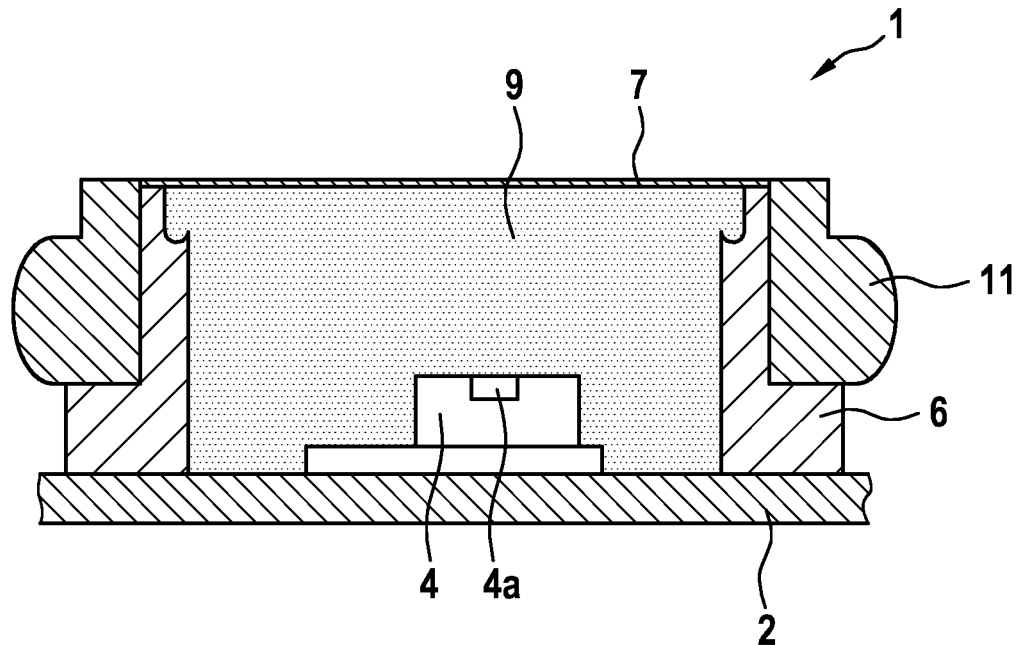
FIG. 5 shows a sensor according to one specific embodiment of the present invention in the final state.

FIG. 5 shows a sensor according to one specific embodiment of the present invention in the final state.

FIG. 5 essentially shows a sensor 1 according to FIG. 4. In contrast to sensor 1 according to FIG. 4, metal layer 10 is missing in sensor 1 according to FIG. 5. Furthermore, a circumferential seal 11 is situated on the outer side of sleeve 6. Seal 11 may be used, during further installation, i.e., during the system integration of sensor 1 into, for example, a consumer electronics product, such as for example a smart phone, to seal the joint between housing 6 of sensor 1 and the housing of the higher-level system, for example of a smart phone or the like. The two-component injection molding manufacturing method may be used for this purpose: in the first molding shot, housing 6 of sensor 1 is generated as a hard component. Thereafter, in the second molding shot, flexible membrane 7 as well as outer seal 11 are jointly generated.

Figure 6:
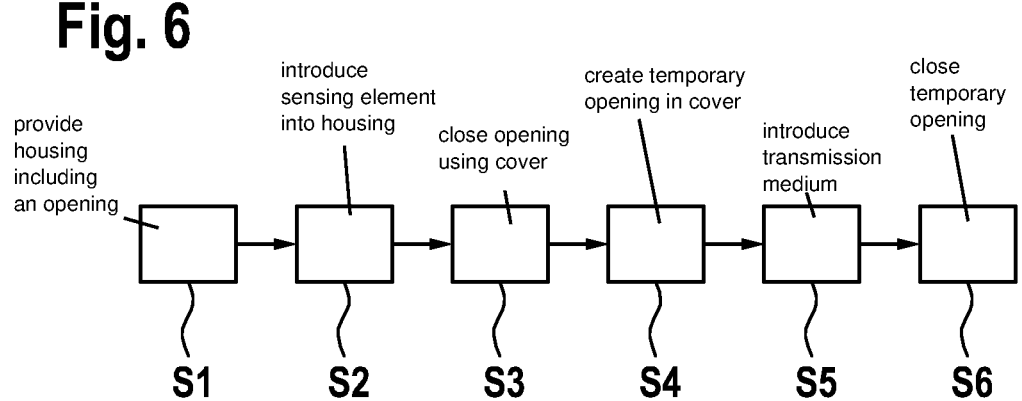
FIG. 6 shows steps of a method for manufacturing a sensor according to one specific embodiment of the present invention.

FIG. 6 shows steps of a method for manufacturing a sensor according to one specific embodiment of the present invention.

FIG. 6 shows steps of a method for manufacturing a sensor, in particular, a pressure sensor, in detail.

It includes the steps:
providing S1 a housing including an opening;
introducing S2 the sensing element into the housing;
closing S3 the opening of the housing with the aid of a cover, in particular, designed as a flexible membrane, the cover being manufactured from a self-healing material, and an interior space being formed in the housing;
creating S4 at least one temporary opening in the cover;
introducing S5 the transmission medium into the interior space through the at least one temporary opening in the cover; and
closing S6 the temporary opening.

In summary, at least one of the specific embodiments of the present invention may provide at least one of the following features and/or one of the following advantages:

simple manufacture, in particular, of a plurality of sensors, in particular, of media-resistant sealed pressure sensors small installation space reliable and rapid filling with the incompressible fluid low manufacturing costs Although the present invention has been described based on preferred exemplary embodiments, it is not limited thereto, but is modifiable in a variety of ways.

What is claimed is:

1. A sensor, comprising:
a sensing element configured to detect a property and/or a composition of a surrounding medium of the sensor;
a transmission medium for transmitting a property and/or a composition of the surrounding medium onto the sensing element, the transmission medium being situated in such a way that the transmission medium is applied to the sensing element;
a cover which distances the transmission medium from the surrounding medium, the cover being manufactured from a self-healing material and being a flexible membrane; and
a housing including an opening, wherein:
the sensing element is situated in an interior space of the housing; and
the cover is arranged as a closure of the opening of the housing, the transmission medium having been introduced into the interior space through at least one temporary opening in the cover that is subsequently closed,
wherein the at least one temporary opening includes two temporary openings, and the cover is structured so that the introduction of the transmission medium is able to take place via one of the two temporary openings which the interior space is vented via a second of the two openings.

2. The sensor as recited in claim 1, wherein the sensor is a pressure sensor.

3. The sensor as recited in claim 1, wherein the transmission medium is an incompressible fluid.

4. The sensor as recited in claim 3, wherein the incompressible fluid is an oil.

5. The sensor as recited in claim 1, wherein a protective layer is situated on the cover.

6. The sensor as recited in claim 5, wherein the protective layer is a metal layer.

7. The sensor as recited in claim 1, wherein the sensor includes a housing in which the sensing element and the transmission medium are situated, the cover closing the housing toward at least one side, and a circumferential seal situated on an outer side of the housing.

8. The sensor as recited in claim 1, wherein the cover is structured so that the closing of the at least one temporary opening occurs automatically and/or only after an appropriate initiation using initiation means.

9. The sensor as recited in claim 1, further comprising a protective layer applied onto the cover.

10. The sensor as recited in claim 1, further comprising a seal on an outer side of the housing formed simultaneously with formation of the cover and a two-component injection molding formation of the housing.

* * * * *